US008517559B1

(12) United States Patent
Freschl

(10) Patent No.: US 8,517,559 B1

(45) Date of Patent: Aug. 27, 2013

(54) MANUALLY-ENERGIZING PORTABLE LIGHT-EMITTING DEVICE WITH MULTIFUNCTION CORD

(75) Inventor: Daniel Joel Freschl, Berkeley, CA (US)

(73) Assignee: Daniel J. Freschl, Berkeley, CA (US)

( * ) Notice: Subject to any disclaimer, the term of this patent is extended or adjusted under 35 U.S.C. 154(b) by 302 days.

(21) Appl. No.: 12/886,395

(22) Filed: Sep. 20, 2010

Related U.S. Application Data

(60) Provisional application No. 61/246,336, filed on Sep. 28, 2009.

(51) Int. Cl.
*B60Q 1/00* (2006.01)

(52) U.S. Cl.
USPC ............ 362/192; 362/105; 362/183; 362/194

(58) Field of Classification Search
USPC .................. 362/183, 184, 192, 253, 105, 194
See application file for complete search history.

(56) References Cited

U.S. PATENT DOCUMENTS

| | | | | |
|---|---|---|---|---|
| 5,358,461 | A | 10/1994 | Bailey, Jr. | |
| 5,887,550 | A * | 3/1999 | Levine et al. | 119/796 |
| 6,959,999 | B2 | 11/2005 | Lee | |
| 7,452,100 | B2 | 11/2008 | Swartfager | |
| 7,497,585 | B2 | 3/2009 | Yu | |
| 7,661,855 | B2 | 2/2010 | Matthew et al. | |
| 7,747,355 | B2 | 6/2010 | Bulthaup et al. | |
| 7,819,088 | B2 * | 10/2010 | Stern | 119/796 |
| 8,157,401 | B2 * | 4/2012 | Lau | 362/105 |
| 8,201,961 | B2 * | 6/2012 | Lau | 362/105 |
| 2002/0135999 | A1 | 9/2002 | Chen | |
| 2008/0271683 | A1 * | 11/2008 | Mitchell | 119/796 |
| 2009/0009986 | A1 | 1/2009 | Wu | |

* cited by examiner

*Primary Examiner* — John A Ward

(57) ABSTRACT

A light-emitting device containing a cord that can be used both to affix the device to an object and as a means of manually recharging the device's energy storage unit is disclosed. The device is configured such that the cord is in communication with an electrical generator and an energy storage unit and can be pulled by a user to supply mechanical energy to the device.

20 Claims, 6 Drawing Sheets

MANUALLY-ENERGIZING PORTABLE LIGHT-EMITTING DEVICE WITH MULTIFUNCTION CORD

CROSS-REFERENCE TO RELATED APPLICATIONS

This application claims the benefit of provisional patent application Ser. No. 61/246,336 filed 2009 Sep. 28 by the present inventor.

BACKGROUND

Portable light-emitting devices that can be worn by the user have been in existence for decades. Although there are many configurations for a user-worn lamp, the fundamental design is the same. These devices consist of an electrical illuminating element, a battery pack (either rechargeable or primary), a housing, and a method for attaching the device to the user's body.

These devices are used in a wide variety of situations that benefit from hands-free operation including but not limited to: mining, cave exploration, subterranean excavation, construction, hiking, climbing, and mountaineering. Users of these devices often put them to use in remote or dangerous situations where an insufficient light source could represent a very serious safety hazard.

One of the main disadvantages of traditional user-worn lamps is that the light projected by the device quickly becomes inadequate for their intended purposes as the battery voltage decays. Because of this problem, users often carry spare batteries that can easily double the effective weight and volume of the device. Many users of these devices are highly concerned about the size and weight of their equipment and find the necessity of backup batteries to be a hindrance. The use of backup batteries also presents an ecological and economic burden.

There have been several attempts at solving the problem of battery voltage decay in such devices through the addition of a user-operated electric generator. These proposed solutions have consisted of either strapping a hand-crank powered electric generator to a standard user-worn lamp or adding a strap to a dynamo-powered flashlight. By adding more components to an existing design these concepts result in a bulky device that add more size and weight than carrying a spare set of batteries.

As with most hand-powered flashlights, attempts at adding an electric generator to a user-worn lamp have made use of a hand-crank with a telescoping handle. In order to keep the size of this device to a minimum the crank must be kept small. This results in a small lever-arm that prohibits users from making use of their full range of motion and leads to inefficient transfer of human energy to the electric-generator.

What is therefore needed is a more compact source of hands-free light that does not require backup-batteries and is efficient to operate.

SUMMARY

The various embodiments of this invention include a light-emitting device comprising a light-emitting element, an electric generator, an energy storage unit, a cord capable of detachably affixing the device to an object or user, and a coupling providing a pathway for transmission of mechanical energy between the cord and the electric generator.

Advantages of one or more aspects of various embodiments of this invention are as follows: to provide a light source that is highly portable, to provide a means for keeping the light-emitting device at maximum brightness, to eliminate the need for backup batteries, to minimize additional components such as a hand crank, to permit a wide range of motion during charging, to provide efficient transfer of human energy to the electric generator, to provide a convenient means of attaching the device to an object or person for hands-free operation. Other advantages of one or more aspects will be apparent from a consideration of the drawings and ensuing description.

DRAWINGS-FIGURES

DETAILED DESCRIPTION

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents.

Embodiments of the invention are related to a manually-energizing, light-emitting device with a multifunctional cord. The term "cord" is used herein to mean any flexible linear member that can transmit force in tension and can be bent into a loop (e.g., string, wire, elastic, cable). The cord is described as multifunctional because it can be used both to affix the device to an object and can also transmit mechanical energy to an electric generator through a mechanical coupling, as will be discussed below.

Figure 1A:
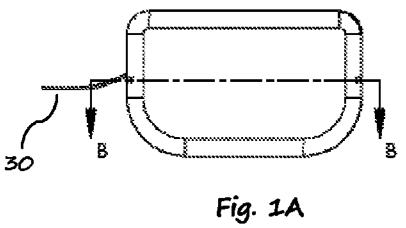
FIGS. 1A and 1B are schematic drawings of an embodiment of the system for coupling mechanical power supplied through the cord to the electric generator.
Figure 1B:
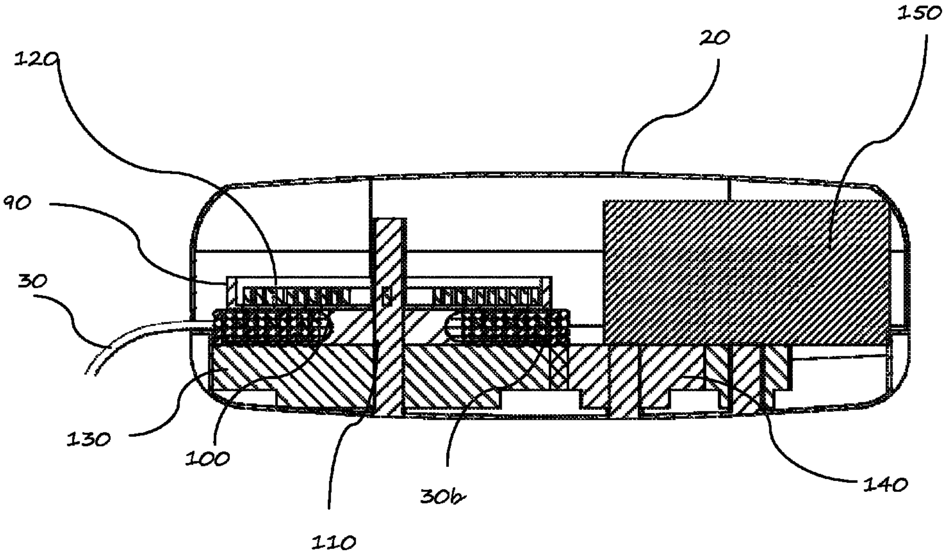

In various embodiments of the invention, the mechanical coupling is an assembly comprising a plurality of components. FIG. 1A shows a top view of such a device with a multifunctional cord 30 extending away from the device. The line B-B shows the line along which a cross section can be cut to produce the cross section view of FIG. 1B. FIG. 1B illustrates one embodiment of the device in which a mechanical coupling 120 comprises an elastic member (such as a rotary return spring), a reel unit 90, a shaft 110, a drive gear 130, and a driven gear 140. In various embodiments of the invention a multifunctional cord 30 is connected to a spool 100 around which the cord 30 is wound. The spool 100 is attached to the reel unit 90 which is configured to apply a retracting force to the cord 30 which is threaded through a cord entry point 50. Retracting force from the elastic member 120 functions to wind the cord 30 onto the spool 100 and serves to apply tension that keeps the cord 30 taut when it is used to secure the light-emitting device to an object.

In various embodiments of the invention, the device includes an energy storage unit (not shown). Said energy storage unit can be electrical (e.g., battery, capacitor) or non-electrical (e.g., spring, elastic, rubber band). In the case of an electrical storage unit, an electric generator 150 is activated by the cord 30, and the electric generator 150 supplies electrical energy to a battery or capacitor (not shown), which, in turn, supplies electrical energy to a light-emitting element (not shown). In the case of a non-electrical energy storage unit, the energy storage unit stores mechanical energy when its resilient member (not shown) is deformed by the cord 30. The stored mechanical energy can be used to do work on the electric generator 150 and provide electrical energy to the light-emitting element without the need for an electrical energy storage unit. The mechanical coupling is the portion of the system responsible for drawing mechanical energy from the cord 30 and transmitting it to the electric generator 150.

In various embodiment of the invention, mechanical power is drawn from the cord 30 only when it is being pulled, not when it is retracting. This dictates decoupling the reel unit 90 from the electric generator 150 during retraction. This can be achieved with a wide array of mechanical devices such as a one-way friction clutch.

In various embodiments of the invention, the reel unit 90 is located internal to a housing 20 containing other electrical and mechanical components of the device. Provisions may be made such that when the cord 30 is fully retracted the cord entry point 50 is obscured. This can serve to protect the unit from water, dust, or other contaminants that may otherwise enter through the cord entry point 50.

Figure 2A:
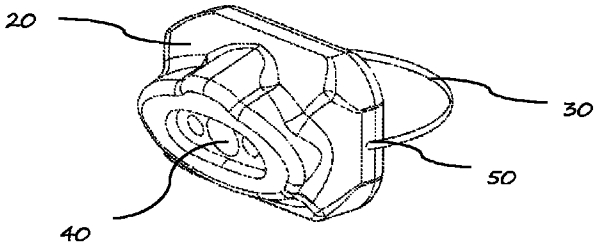
FIG. 2A is a schematic drawing of an embodiment of the light-emitting device showing a cord that can be extended from the unit.
Figure 2B:
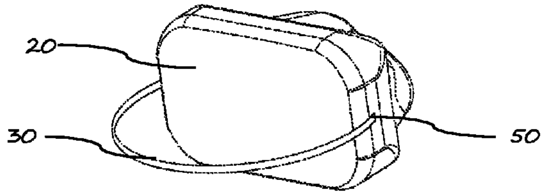
FIG. 2B is another view of the light-emitting device of FIG. 2A.
Figure 2C:
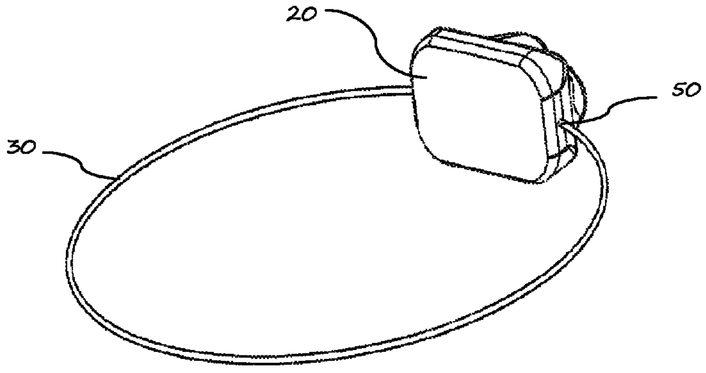
FIG. 2C is a schematic drawing of the light-emitting device of FIG. 2A with the cord extended from the unit.

FIG. 2A is a schematic drawing of an embodiment of a light-emitting device whose cross-section is shown in FIG. 1B, according to an embodiment of the invention. The multifunctional cord 30 extends from the housing 20 through the cord entry point 50 as discussed above. The device also contains a light-emitting element 40. FIG. 2B shows another view of the light-emitting device of FIG. 2A with the housing 20, the multifunctional cord 30, and the cord entry point 50. FIG. 2C is a schematic drawing of the light-emitting device of FIG. 2A with the multifunctional cord 30 unreeled from the housing 20 through the cord entry point 50.

Figure 3A:
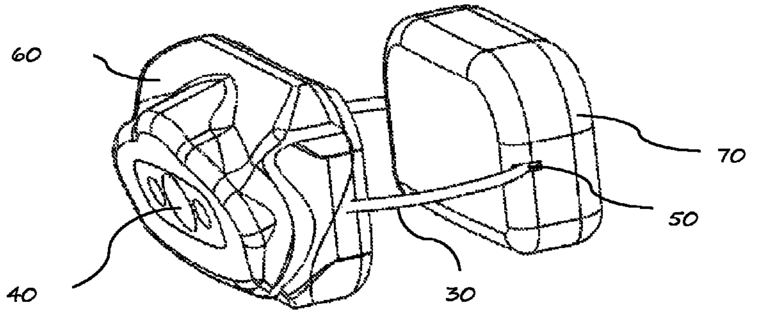
FIG. 3A is a schematic drawing of a light-emitting device in which the components are split into multiple portions and connected by at least one cord, according to an embodiment of the invention.
Figure 3B:
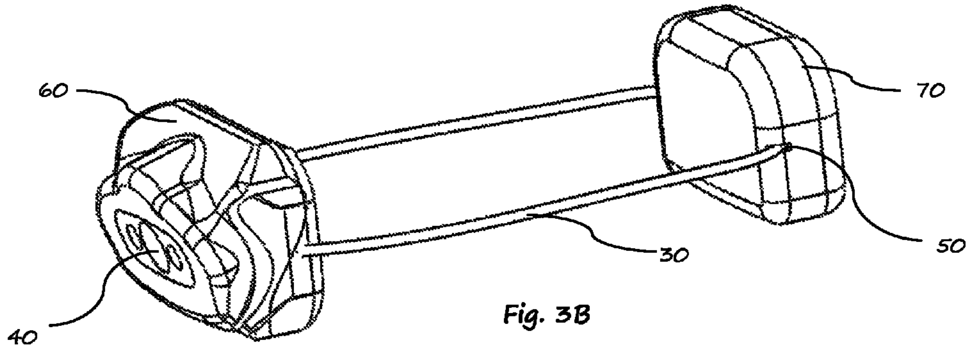
FIG. 3B is a schematic drawing of the light-emitting device of FIG. 3A with the cord extended.

As shown in FIGS. 3A and 3B, in various embodiments of the invention, components of the device are not all co-located, but are arranged in separate portions or sections 60 and 70. Section 60 may contain components such as a light-emitting unit 40. Section 70 may contain components such as a generator and/or an energy storage unit (not shown). The portions 60 and 70 are connected to one another with one or more multifunctional cords 30, at least one of which is in mechanical communication with the electric generator and/or the energy storage unit inside section 70. Splitting the components into multiple portions or sections 60 and 70 allows the weight of the device to be balanced evenly across the object to which it is secured and may provide a more stable attachment. FIG. 3B is a schematic drawing of the light-emitting device of FIG. 3A with the cord extended.

In various embodiments of the invention the multifunctional cord 30 is also an electrically conducting material. In these embodiments the cord 30 can provide a path for electrical communication among components of the light-emitting device that are located in separate portions.

In various embodiments of the invention the multifunctional cord 30 is configured to prevent the light-emitting device from being turned on unintentionally. Electrical energy flows to the light-emitting element 40 only when the multifunctional cord 30 has been unwound from the spool 100 (shown in FIG. 1B) at least partially. This prevents accidental discharge of the energy storage unit.

Figure 4:
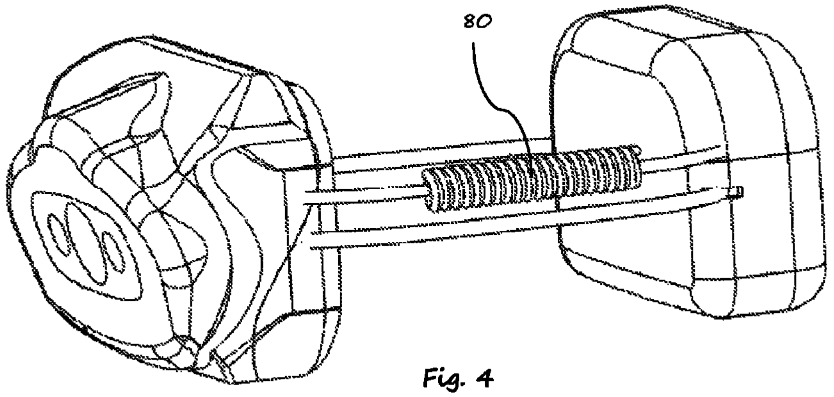
FIG. 4 is a schematic drawing of the light-emitting device in which the components are split into multiple portions and connected with an additional electrically conducting element, according to an embodiment of the invention.

As shown in FIG. 4, various embodiments of the invention contain a separate electrically conductive cord 80. The electrically conductive cord 80 provides a path of electrical communication among components of the light-emitting device that are located in separate portions or sections 60 and 70.

Figure 5:
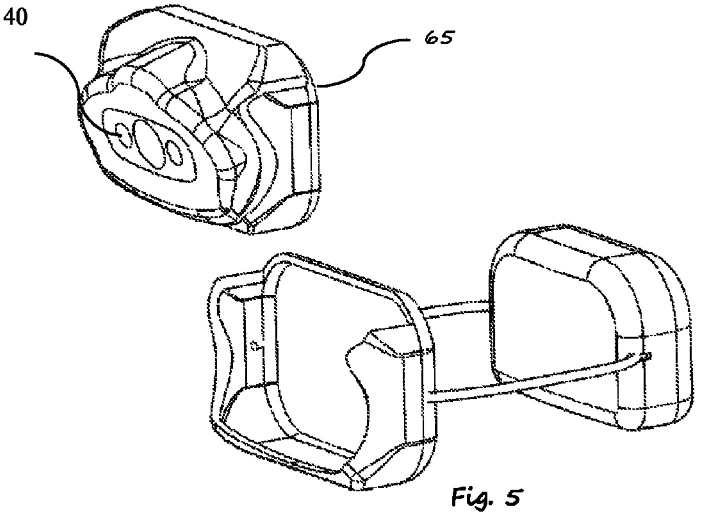
FIG. 5 is a schematic drawing of the light-emitting device in which the components are located in separate portions that can be detached from each other, according to an embodiment of the invention.

As shown in FIG. 5, in various embodiments of the invention the components are located in separate portions that can be detached from each other. FIG. 4 depicts one version of this embodiment in which a housing 65 containing a light-emitting element 40 can be detached and used without other components.

In various embodiments of the invention the light-emitting device comprises a plurality of light-emitting elements. These elements are of a type including but not limited to an incandescent bulb, a fluorescent tube, a light emitting diode (LED), an organic light emitting diode (OLED), or a laser diode. The light emitting elements may produce light in a variety of spectra including but not limited to infrared (IR) light, visible light of any color, or ultraviolet (UV) light. The light-emitting device may be configured such that all of the light-emitting elements are of the same type or of a mixture of different types.

Figure 6:
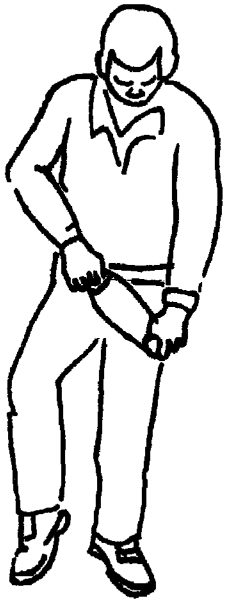
FIG. 6 is a schematic drawing of the light-emitting device of FIG. 5 being manually charged by a user.

FIG. 6 is a schematic drawing of the light-emitting device of FIG. 5 being manually charged by a user.

Figure 7:
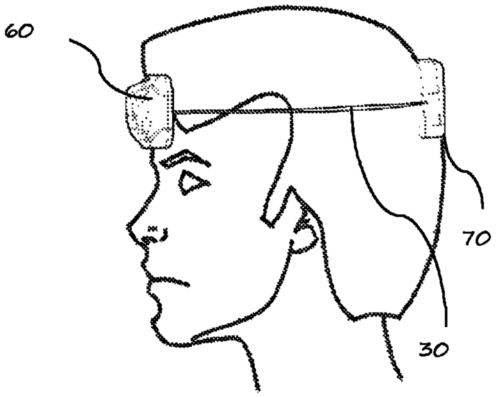
FIG. 7 is a schematic drawing of the light-emitting device of FIG. 5 worn by a user.

FIG. 7 is a schematic drawing of the light-emitting device of FIG. 5 worn by a user.

Figure 8:
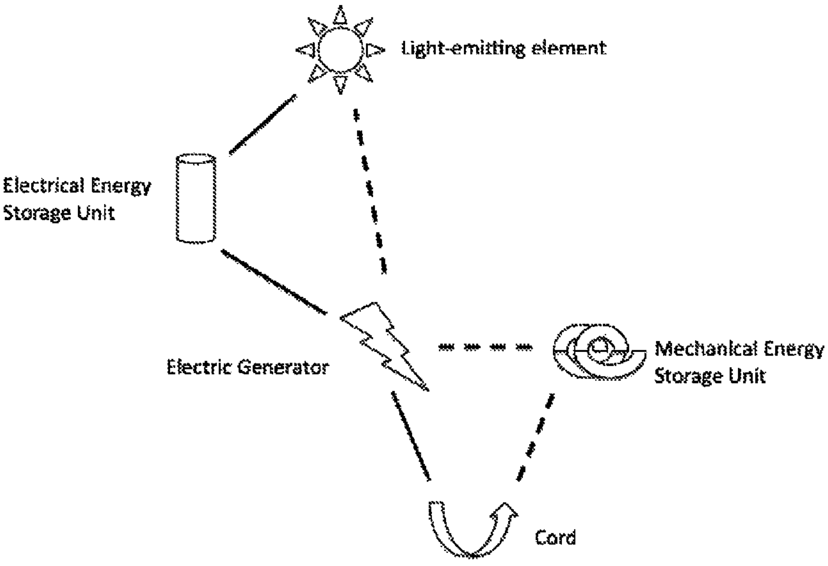
FIG. 8 is a schematic showing the paths that energy can take to get from the cord to the light-emitting element in two of the possible embodiments of the invention. Note: the solid line shows the path taken with an electrical energy storage unit and the dotted line shows the path taken with a mechanical energy storage unit.

FIG. 8 is a schematic showing the paths that energy can take to get from the cord to the light-emitting element in two of the possible embodiments of the invention. Note: the solid line shows the path taken with an electrical energy storage unit and the dotted line shows the path taken with a mechanical energy storage unit.

In various embodiments of the invention the light-emitting device contains a logic controlling device. This logic controlling device is capable of carrying out functions according to a set of programmed instructions. Such functions include but are not limited to pulsing electricity to the light emitting element creating a strobe effect, turning the device off after a predetermined amount of time, creating electrical connections between the power source and a plurality of light-emitting elements, and monitoring battery voltage. The logic controlling device may be in electrical communication with a user input device such as a button or a switch.

In various embodiments of this invention the light-emitting device comprises electrical contacts capable of forming electrical communication to a power supply peripheral to the device. Possible peripheral power supplies include but are not limited to a wall outlet, an automotive cigarette lighter, or a solar panel. In order to facilitate the use of peripheral power supplies, the light-emitting device may include circuitry designed to control at least one of the properties of the electricity supplied from the power supply. These properties include but are not limited to current, voltage, frequency and power.

In various embodiments of the invention the light-emitting device comprises power controlling circuitry in electrical communication with an energy storage unit and a light-emitting element. This power controlling circuitry regulates at least one of the properties of the electricity being transmitted from the energy storage unit to the light-emitting element. These properties include but are not limited to current, voltage, frequency and power.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

What is claimed:

1. A portable light-emitting device comprising the following components:

a light-emitting element;

an electric generator in electrical communication with the light-emitting element;

an energy storage unit in electrical communication with the generator;

a cord detachably affixed to another region of the device;

and a coupling providing a pathway for transmission of mechanical energy between the cord and the electric generator.

2. The portable light-emitting device as in claim 1 further comprising a reel around which the cord can be wound.

3. The portable light-emitting device as in claim 2 wherein said reel is configured to apply a retracting force to the cord.

4. The portable light-emitting device as in claim 3 wherein electrical energy is prevented from flowing to the light-emitting element when the cord is in a fully retracted position.

5. The portable light-emitting device as in claim 1 further comprising a lens positioned over the light-emitting element.

6. The portable light-emitting device as in claim 1 further comprising a reflector positioned adjacent to the light-emitting element.

7. The portable light-emitting device as in claim 1 wherein the components of the light-emitting device are distributed into more than one portion of the device, the portions each connected to the cord.

8. The portable light-emitting device as in claim 7 wherein the cord comprises an electrically conducting element that can transmit electric energy among the portions of said device.

9. The portable light-emitting device as in claim 1 wherein the cord and generator are detachably connected to the device.

10. The portable light-emitting device as in claim 1 wherein the device further comprises a plurality of light-emitting elements.

11. The portable light-emitting device as in claim 10 wherein the device further comprises a logic-controlling device.

12. The portable light-emitting device as in claim 11 wherein the logic controlling device is capable of completing any of a plurality of electrical circuits among the plurality of light-emitting elements and the energy storage unit.

13. The portable light-emitting device as in claim 12 wherein the device further comprises a switch in electrical communication with the logic-controlling device.

14. The portable light-emitting device as in claim 1 wherein the device further comprises electrical contacts capable of making electrical contact to a power supply peripheral to said device.

15. The portable light-emitting device as in claim 14 wherein said device comprises circuitry designed to control properties of electricity entering the device wherein the properties can be one or more of current, voltage, frequency and power.

16. The portable light-emitting device as in claim 1 wherein said device comprises circuitry designed to control properties of the electricity supplied to the light-emitting element wherein the properties can be one or more of current, voltage, frequency and power.

17. A portable light-emitting device comprising the following components:

at least one light emitting diode (LED);

an electric generator in electrical communication with the LED;

a rechargeable battery or capacitor in electrical communication with the generator;

a cord detachably affixed to another region of the device;

a reel around which the cord can be wound wherein said reel is configured to apply a retracting force to the cord;

and a coupling providing a pathway for transmission of mechanical energy between the cord and the electric generator.

18. The portable light-emitting device as in claim 17 wherein the components of the light-emitting device are distributed into more than one portion of the device, the portions each connected to the cord.

19. The portable light-emitting device as in claim 17 wherein the cord and generator are detachably connected to the device.

20. A portable light-emitting device comprising the following components:

a light-emitting element;

an electric generator in electrical communication with the light-emitting element;

an energy storage unit in electrical communication with the generator;

a cord comprising an electrically conducting element that can transmit electric energy among the portions of said device wherein the cord is capable of detachably affixing the device to an object or user;

and a coupling providing a pathway for transmission of mechanical energy between the cord and the electric generator.

* * * * *